(12) United States Patent
Zhao et al.

(10) Patent No.: US 9,668,127 B2
(45) Date of Patent: May 30, 2017

(54) METHOD FOR ALLOCATING COMMUNICATION KEY BASED ON ANDROID INTELLIGENT MOBILE TERMINAL

(71) Applicants: QUANTUMCTEK CO., LTD., Hefei, Anhui (CN); Shangdong Institute of Quantum Science and Technology Co., Ltd., Jinan, Shandong (CN)

(72) Inventors: Yong Zhao, Jinan (CN); Chunhua Liu, Jinan (CN)

(73) Assignees: QUANTUMCTEK CO., LTD., Hefei, Anhui (CN); SHANDONG INSTITUTE OF QUANTUM SCIENCE AND TECHNOLOGY CO., LTD., Jinan, Shandong (CN)

( * ) Notice: Subject to any disclaimer, the term of this patent is extended or adjusted under 35 U.S.C. 154(b) by 15 days.

(21) Appl. No.: 14/896,231

(22) PCT Filed: Jun. 6, 2014

(86) PCT No.: PCT/CN2014/079373
§ 371 (c)(1),
(2) Date: Dec. 4, 2015

(87) PCT Pub. No.: WO2014/194856
PCT Pub. Date: Dec. 11, 2014

(65) Prior Publication Data
US 2016/0119783 A1    Apr. 28, 2016

(30) Foreign Application Priority Data

Jun. 8, 2013 (CN) .......................... 2013 1 0228443

(51) Int. Cl.
*H04W 12/04* (2009.01)
*H04L 9/08* (2006.01)
(Continued)

(52) U.S. Cl.
CPC ............ *H04W 12/04* (2013.01); *G06F 21/62* (2013.01); *H04L 9/0822* (2013.01);
(Continued)

(58) Field of Classification Search
CPC .... H04W 12/04; H04L 9/0822; H04L 9/0891; H04L 63/0428; H04L 9/16; G06F 21/62
(Continued)

(56) References Cited

U.S. PATENT DOCUMENTS 9,529,996 B2 * 12/2016 Qureshi .................. G06F 21/53
726/1
2011/0225417 A1 * 9/2011 Maharajh ................ G06F 21/10
713/150
(Continued)

FOREIGN PATENT DOCUMENTS

CN          101110671        1/2008
CN          101483808        7/2009
(Continued)

*Primary Examiner* — Haresh N Patel
(74) *Attorney, Agent, or Firm* — Maschoff Brennan

(57) ABSTRACT

Disclosed is a method for allocating a communication key based on an Android intelligent mobile terminal. By establishing a universal secret communication platform on the bottom layer of an Android operating system, an intelligent mobile terminal is equipped with the functions of being able to interact with a secret communication support network, receiving a two-level key and using a received service key after decrypting same, thereby being able to provide universal bottom-layer support for a VoIP secret call, a secret short message, a secret video call, file encryption transmission, secure mobile payment and other communication services which require secrecy support. The secret communication support network provides the service keys required for various communication services for a reformed intelligent mobile terminal, and after obtaining the service keys, (Continued)

the intelligent mobile terminal uses same to conduct the secret communication.

10 Claims, 3 Drawing Sheets

(51) Int. Cl.
  *G06F 21/62* (2013.01)
  *H04L 29/06* (2006.01)
  *H04L 9/16* (2006.01)
(52) U.S. Cl.
  CPC ........ *H04L 9/0891* (2013.01); *H04L 63/0428* (2013.01); *H04L 9/16* (2013.01)
(58) Field of Classification Search
  USPC ................................ 380/79; 709/224; 726/1
  See application file for complete search history.

(56) References Cited

U.S. PATENT DOCUMENTS

| | | | | |
|---|---|---|---|---|
| 2011/0258049 A1* | 10/2011 | Ramer | ............. | G06F 17/30867 705/14.66 |
| 2012/0036552 A1* | 2/2012 | Dare | .................. | H04L 41/0253 726/1 |
| 2012/0084792 A1* | 4/2012 | Benedek | ................ | G06F 9/544 719/313 |
| 2012/0201381 A1* | 8/2012 | Miller | ....................... | H04L 9/16 380/255 |
| 2012/0233668 A1* | 9/2012 | Leafe | .................... | G06F 9/5022 726/4 |
| 2013/0205028 A1* | 8/2013 | Crockett | ................ | G06F 9/5027 709/226 |
| 2013/0238785 A1* | 9/2013 | Hawk | ................... | G06F 9/5072 709/224 |
| 2013/0247034 A1* | 9/2013 | Messerli | ............. | G06F 9/45533 718/1 |
| 2013/0304903 A1* | 11/2013 | Mick | ................... | H04L 43/0817 709/224 |
| 2013/0332723 A1* | 12/2013 | Tan | ........................ | G06F 21/606 713/150 |
| 2014/0007222 A1* | 1/2014 | Qureshi | .................. | G06F 21/10 726/16 |
| 2014/0059226 A1* | 2/2014 | Messerli | ................. | G06F 9/546 709/226 |
| 2014/0164400 A1* | 6/2014 | Kruglick | ........... | G06F 17/30887 707/749 |
| 2014/0245368 A1* | 8/2014 | Park | ................... | H04N 21/4312 725/110 |
| 2014/0282889 A1* | 9/2014 | Ishaya | ..................... | H04L 63/08 726/4 |

FOREIGN PATENT DOCUMENTS

| | | |
|---|---|---|
| CN | 102867142 | 1/2013 |
| CN | 102958021 | 3/2013 |

* cited by examiner storage space for the service keys

METHOD FOR ALLOCATING COMMUNICATION KEY BASED ON ANDROID INTELLIGENT MOBILE TERMINAL

CROSS-REFERENCE TO RELATED APPLICATIONS

This application is a National Stage application of PCT international application PCT/CN2014/079373, filed on Jun. 6, 2014 which claims priority to Chinese Patent Application No. 201310228443.1, filed with the Chinese Patent Office on Jun. 8, 2013, both of which are incorporated herein by reference in their entireties.

FIELD

The present disclosure relates to secret communication technology for a mobile terminal, and in particular to a method for distributing communication keys based on an Android intelligent mobile terminal.

BACKGROUND

At present, mobile communication technology is applied widely in daily life. However, encryption is not performed in most processes of communication, and hence a third party is easy to intercept the communication. Although some operators encrypt a data flow in the stage of wireless transmission process, it is required that the data flow is in an encrypted state during the whole transmission processes in the case of a higher secret requirement, to avoid being intercepted in some middle stages of the transmission. Therefore, end-to-end encryption needs to be applied in a mobile communication process. That is, encryption and decryption are performed by a calling terminal and a called terminal, respectively. In this way, user information security can be protected effectively, no matter which network the data flows through.

In general, a mobile terminal does not have a function of supporting end-to-end secret communication. In some existing technologies, hardware of the mobile terminal is usually reconstructed firstly by adding an encryption-decryption module, a key storage module and the like, to form a special mobile terminal which supports a certain secret communication way. However, the above solution has the following disadvantages. In the first aspect, the cost is high. A new type of terminal needs to be designed and produced only for a secret communication function, which is not conductive to popularizing the new designed terminal due to a high technical requirement. In the second aspect, from a user perspective, most of users want their current mobile terminal to have the secret communication function, instead of replacing their current mobile terminal with a new mobile terminal only for the secret communication function.

As the popularization of an Android intelligent operating system in recent years, a market share thereof is increasing. It is possible to add secret communication function with high security to an Android intelligent cell phone or other Android intelligent mobile terminal in a pure software way while maintaining original functions thereof. At present, there are some simple communication encryption tools under an Android environment or other mobile operating system in the market, for example, small application software such as short message encryption. However, since keys are difficult to be distributed, the encryption is performed with a mathematical algorithm or by reusing (or reusing in variations) the key. Alternatively, one or more file/key blocks in a permanent storage medium of the mobile terminal are directly used as service keys for each call. However, the keys are easy to be broken or be broken after being exported, which can not be applied to a scenario having a high security requirement. Moreover, at present, the encryption communication software with such security intensity is generally limited to encrypt small amount of information such as a short message on an intelligent mobile platform, and can only protect specified one or more services. It is very short of a universal secret intelligent mobile terminal platform capable of providing a one-time pad for a large data amount communication service such as a VoIP call and a video call. A method for encrypting information with application software is still unreliable. It is because that the software is installed in Android operating system; and if the software can be installed by the user, it can also be maliciously uninstalled by an attacker. Therefore, the software has poor security and is not adapted to the scenario having a high security requirement.

SUMMARY

The present disclosure provides a method for distributing communication keys based on an Android intelligent mobile terminal to address the above problems. In the method, a universal secret communication platform is established at bottom layers of Android operating system, which enables the intelligent mobile terminal to interact with a secret communication support network, receive two-level keys, decrypt received service keys and use the decrypted service keys. Therefore, a universal bottom layer support is provided for communication services requiring a secret support, such as a VoIP secret call, a secret short message, a secret video call, file encryption transmission, a secure mobile payment. The service keys required for various communication services are provided for the modified intelligent mobile terminal through the secret communication support network, and the intelligent mobile terminal obtains the service keys and uses them to perform secret communications.

To achieve the above object, the following technical solution is provided according to the present disclosure.

A method for distributing communication keys based on an Android intelligent mobile terminal includes:

(1) establishing a universal secret communication platform in bottom layers of an Android operating system, invoking Application Programming Interfaces (APIs) of the universal secret communication platform in source codes of communication software programs in an application layer, compiling modified source codes of the Android operating system into an image file and writing the image file into the intelligent mobile terminal;

(2) directly connecting the intelligent mobile terminal to a key terminal in a secret communication support network, downloading shared keys between the intelligent mobile terminal and the secret communication support network, storing the shared keys into the intelligent mobile terminal, and disconnecting the intelligent mobile terminal with the key terminal after the shared keys are downloaded;

(3) after a communication service is initiated, generating, by the intelligent mobile terminal, a service key acquisition thread by invoking the APIs of the universal secret communication platform in the bottom layers of the system, and requesting service keys for the communication from the secret communication support network;

(4) distributing, by the secret communication support network, the service keys for the communication to the intelligent mobile terminal participating in the communication after the request for the service keys is received;

(5) receiving, by the intelligent mobile terminal, the service keys for the communication from the secret communication support network by invoking the APIs of the universal secret communication platform in the bottom layers of the system; and storing, by the intelligent mobile terminal, the service keys in a memory space of the intelligent mobile terminal; and (6) performing, by the intelligent mobile terminal, a secret communication by using the service keys.

In the step (1), establishing the universal secret communication platform may include:

(1-1) adding a secret communication function library in a C/C++ framework layer of source codes of the Android operating system, where the secret communication function library is configured to realize a basic function related to the secret communication, the basic function includes instruction interaction with the secret communication support network, key request, key downloading, key management and encryption-decryption operations; and an invocation to the secret communication function library is provided for a Java framework layer of the Android through Java Native Interface (JNI), where the secret communication function library is compiled into a '*.so' library file; and (1-2) adding a secret communication class to the Java framework layer of the source codes of the Android operating system, where the secret communication class invokes the secret communication function library provided in the C/C++ framework layer with the JNI interface, encapsulates and extends the secret communication function library in the Java framework layer, and provides an upper application layer with secret communication related system APIs, which are the APIs of the universal secret communication platform and to be invoked by communication software in the application layer.

In the step (3), requesting, by the intelligent mobile terminal, the service keys may include:

(3-1) after the communication service is initiated, invoking, by the communication software in the application layer, the APIs of the universal secret communication platform in the bottom layers of the system; and generating a new service key acquisition thread, wherein the new service key acquisition thread is connected to the secret communication support network wirelessly; and (3-2) after the connection is established, transmitting, by the intelligent mobile terminal, information related to the communication to the secret communication support network, to request service keys for the communication, wherein the information includes an identity of a calling terminal, an identity of a called terminal, authentication information, information for indicating which service the service keys are requested for, and information for indicating whether the service keys are used to perform encryption or decryption.

Further, in the step (4), distributing, by the secret communication support network, the service keys to the intelligent mobile terminal may include:

(4-1) establishing a network service thread, to wait for a connection to the service key acquisition thread of the intelligent mobile terminal;

(4-2) after a connection to the intelligent mobile terminal is established and the request for the service keys is received from the intelligent mobile terminal, obtaining a service type of the communication, an identity of the terminal, authentication information and a purpose of the service keys; determining whether the intelligent mobile terminal has permission to request the service keys; and distributing the service keys to be downloaded to an intelligent mobile terminal having the permission;

(4-3) encrypting, by the secret communication support network, the service keys to be transmitted, by using the shared keys between the intelligent mobile terminal and the secret communication support network; and (4-4) transmitting, by the secret communication support network, the encrypted service keys to the intelligent mobile terminal wirelessly.

For, the shared keys between the secret communication support network and the intelligent mobile terminal, I. current usage information of the shared keys is stored in a header of the shared keys stored in the secret communication support network, and the header is filtered out, when the shared keys are downloaded to the intelligent mobile terminal;

II. when encrypting the service keys, the secret communication support network extracts a current usage location of the shared keys from the header of the shared keys between the secret communication support network and the intelligent mobile terminal; encrypts the service keys to be transmitted, by using the shared keys at the current usage location; implicitly adds the information on the location in an idle reserved bit of the encrypted service keys, and updates the header of the shared keys;

III. after receiving the encrypted service keys transmitted by the secret communication support network, the intelligent mobile terminal extracts the information on the location implied in the encrypted service keys, and decrypts the received service keys by combining the shared keys between the intelligent mobile terminal and the secret communication support network stored in the intelligent mobile terminal with the information on the location and using the shared keys at the location; and IV. in a case that the amount of shared keys between the secret communication support network and the intelligent mobile terminal is not enough, the intelligent mobile terminal downloads new shared keys from the secret communication support network according to the step (2).

In the step (5), receiving the service keys, by the intelligent mobile terminal may include: once the amount of the service keys downloaded by the intelligent mobile terminal reaches a minimal threshold under which a secret communication can be performed for a current service type, informing a corresponding application of being capable of using the service keys, and then using the service keys while continuously downloading the service keys until the service keys are downloaded completely.

In the memory space of the intelligent mobile terminal in the step (5), (5-1) a logically annular memory space is set up by the intelligent mobile terminal for each service key acquisition thread, where the annular memory space is configured to store the service keys received from the secret communication support network, and a size of the memory space depends on a service type;

(5-2) a reading location pointer is provided by the intelligent mobile terminal for each annular memory space for storing the service keys, where in a secret communication using the service keys, the appropriate amount of service keys are read from a location pointed by the reading location pointer, and then are used to perform encryption-decryption on communication information; the reading location pointer moves on in the annular memory space and always points to a starting address of the service keys to be read next time, and the service keys are continued to be read from the beginning of the annular space when the pointer passes the end of the annular space; and (5-3) a writing location pointer is provided by the intelligent mobile terminal for each annular memory space for storing the service keys, where the received service keys are stored into the annular memory space from a location pointed by the writing location pointer; the writing location pointer moves on in the annular memory space and always points to a starting address of the annular memory space where service keys are stored next time, and service keys are continuously written from the beginning of the annular space when the pointer passes the end of the annular space; the amount of service keys requested from the secret communication support network each time does not exceed a size of the annular memory space;

(5-4) after the service keys are downloaded the first time, in a case that a distance between locations pointed by the writing location pointer and reading location pointer respectively in the annular memory space reaches a predetermined threshold, the intelligent mobile terminal requests to download service keys again from the secret communication support network; and (5-5) after the communication service is ended, the memory space for storing the service keys is retrieved by the system, and data in the memory space are destroyed.

The above shared keys and/or the service keys may be used in a way of one-time pad, or may be used as various popular symmetric/asymmetric encryption and decryption keys.

The solution of the present disclosure mainly has the following features.

(1) The Android operating system has a capability of acquiring keys from a secret communication support network by modifying Java framework layer and its lower layers of the Android system. The capability can be solidified in the operating system and will not be changed when there is a change in software in the application layer. In addition, API interfaces are provided in the application layer, such that other communication software developed by a third party in application layer can invoke the secret communication support provided from bottom layers by the operating system, to add a secret communication function to the software.

(2) The universal secret communication platform is independent from specific services, various service application software running in the application layer can perform various operations of a secret communication process in the application software by invoking the APIs of the universal secret communication platform.

(3) The header of the shared keys between the secret communication support network and the intelligent mobile terminal is only stored in the secret communication support network. A duplication of the shared keys stored in the intelligent mobile terminal does not include information on the current usage location of the keys. In this way, even in an extreme case, for example, in the case that the mobile terminal is stolen and the shared keys between the mobile terminal and the secret communication support network are exported, it is difficult to determine a beginning location of shared keys used in a former secret communication or a latter secret communication based on the exported shared keys, and hence it is difficult to break effective information.

(4) The secret communication support network uniquely determines which kind of service keys to be distributed to a certain thread, based on the information related to the communication and transmitted by the intelligent mobile terminal, where the information includes an identity of a calling terminal, an identity of a called terminal, authentication information, information for indicating which service the service keys are requested for, information for indicating whether the service keys are used to perform encryption or decryption.

(5) The service keys for each communication are not requested by the intelligent mobile terminal until the communication is about to start, and are transmitted by the secret communication support network. Furthermore, even if transmitted to the intelligent mobile terminal, the service keys are only stored in a memory space set up temporarily and will be cleared immediately when the communication is over.

(6) The keys can be acquired from the secret communication support network, and especially, the service keys can be acquired in a real time manner, which therefore can support an encryption way with high security such as one-time pad.

(7) The logically annular memory space is provided to store the service keys, and new keys need to be downloaded to replace old keys when the keys are consumed to a certain extent.

The present disclosure has the following advantages. With the method according to the present disclosure, the Android intelligent mobile terminal has the capability of downloading keys from a secret communication support network, multiple secret communication services are provided for various mobile devices running an Android system, and in particularly, a bottom layer software platform is provided for a communication service having a large amount of data to perform secret communication with high security such as one-time pad. In this case, a manufacturer of the mobile terminal only needs to modify and update source codes of an existing intelligent mobile terminal supporting the Android operating system, instead of a production of a special encryption mobile terminal. In addition, the manufacturer may provide a customer with a complete ROM or an upgraded firmware having a secret communication function in a disk or through a network, to allow the customer to upgrade the mobile terminal by himself. It is convenient for a user to join the existing intelligent mobile terminal into a secret network, and thus the intelligent mobile terminal has a secret communication function with high security without any modification on hardware. A developer of various communication application software on the Android platform only needs to invoke APIs related to secret communication and added in the bottom layers of the system, to encrypt or decrypt a communication data flow of the software if desiring that the secret communication function can be applied on his own software.

In addition, an object of the present disclosure is to provide a method for establishing a universal secret communication platform at the bottom layers of the Android operating system. The communication service keys are distributed by cooperating the universal secret communication platform with a secret communication support network. The method is not limited to a specific communication service or terminal, therefore the method can be applied not only to the intelligent mobile terminal, but also directly or with slight changes to an intelligent television, a set top box and the like which runs the Android system. Thus, these devices can also have a capability of performing a secret communication on the premise of availability of software and hardware of the devices. In the present disclosure, since the Java framework layer and the native C/C++ framework layer rather than the applications layer of the Android operating system is modified, the secret capability is solidified in the operating system, and therefore the security is improved greatly unlike some secret application software which can be uninstalled or replaced maliciously. Moreover, comparing with secret communication application software for a certain specific service on the market, the present disclosure can provide a secret service for any third-party communication program at the application layer, which has advantages on universality, expansibility and compatibility.

DETAILED DESCRIPTION OF EMBODIMENTS

In the following, the present disclosure is further described in conjunction with the drawings and the embodiments.

The present disclosure is intended to provide a method for distributing communication keys based on an Android intelligent mobile terminal, which includes the following steps and parts.

In step (1), a universal secret communication platform is established at bottom layers of an Android operating system, APIs of the universal secret communication platform are invoked in source codes of communication software programs in an application layer, modified source codes of the Android operating system are compiled into an image file, and the image file is written into the intelligent mobile terminal.

Figure 1:
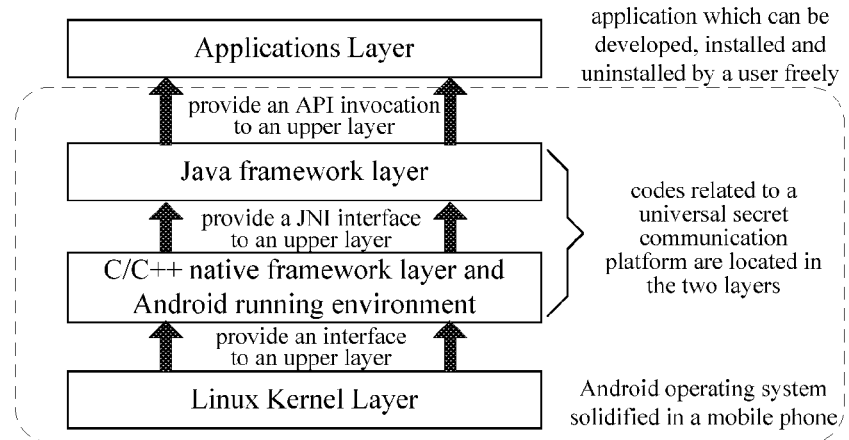
FIG. 1 is a schematic structural diagram of software layers of an Android operating system.

The universal secret communication platform at the bottom layers of the Android operating system is realized in the following way. A secret communication basic function library is added into a C/C++ framework layer of source codes of the Android operating system. The secret communication basic function library may be added into 'bionic' (or may be added at other location, and 'bionic' is optimal). The secret communication basic function library is configured to realize a basic function related to a secret communication. The basic function includes, for example, instruction interaction with the secret communication support network (the secret communication support network, independent from the intelligent mobile terminal, is a network topology entity responsible for generating keys and distributing the keys to the intelligent mobile terminal. The secret communication support network can receive key request from the intelligent mobile terminal, cooperate with the related function of the universal secret communication platform of the intelligent mobile terminal, and provide keys of each level required for a communication service for the intelligent mobile terminal. The keys may be quantum keys or other conventional keys), key request, key downloading, key management and encryption-decryption operations. Since 'bionic' is a basic C language library used in the C/C++ framework layer of the Android operating system (a structure of software layers of the Android operating system is as shown in FIG. 1, each APP developed by a third-party developer is located at an applications layer. Relatively, the Java framework layer, the C/C++ native framework layer and an Android running environment, and a Linux Kernel layer, at the lower layers of the applications layer, all refer to as the bottom layers of the Android system herein. The bottom layers of the system are basic portions of the operating system and are solidified in the intelligent mobile terminal, and thus it is impossible for a user to arbitrarily install or uninstall the bottom layers of a system unlike the software in the applications layer), the added function here is also regarded as a portion of the basic function library of the Android system and can be invoked arbitrarily in the Android C/C++ framework layer. Then, a secret communication advanced function library is added to the Android C/C++ framework layer. The advanced function library invokes the basic function in 'bionic', such as the key downloading and the key management; and is encapsulated and extended on this basis, which provides an invoking interface of JNI for the Java framework layer of the Android system. The secret communication function library in C/C++ framework is compiled into '*.so' library file(s). A secret communication class is added into the Java framework layer of the Android system. The secret communication class invokes the secret communication advanced function library provided in C/C++ framework layer with the JNI interface, which is further encapsulated and extended in the Java framework layer. In this way, system APIs related to the secret communication (the added APIs are the same as the official system APIs in the Android system in terms of usage), i.e. the APIs of the universal secret communication platform, are provided for an upper application layer, to be invoked by various communication software in the application layer. In this way, various application communication programs developed by other people based on the Android system can invoke the added system APIs to realize various operations such as connection with the secret communication support network, key downloading and encryption-decryption. Uniform APIs are provided at the bottom layers for different application layer software. When the APIs are called, only invoking parameters need to be modified for different services. Taking a case that key downloading is triggered in a VoIP service as an example, codes for invoking a Java API of 'key request' of the universal secret communication platform in the bottom layers of the Android system are added at a specified location (generally in the codes representing the service process between an initiation/reception of a call request and an actual establishment of the call) of source codes of a VoIP call software in the application layer of the Android system, and corresponding parameters are set, therefore a request for required service keys can be triggered at a right time.

Of course, the universal secret communication platform in the bottom layers of the system may be realized and invoked in multiple variations. For example, the basic function library and the advanced function library in Android C/C++ framework layer are combined together, or a function of the secret communication function library defined in the C/C++ framework layer is realized in the Java framework layer. However, if totally realized in the Java framework layer, the function is easy to be decompiled. Hence, a securer method is to realize a core function of the universal secret communication platform in the Android C/C++ framework layer. In this way, it is difficult to effectively decompile a compiled '*.so' library file, thereby details of acquiring and using the keys and details of realizing an encryption-decryption algorithm can be protected to the greatest extent.

In addition, each function interface in the C/C++ framework layer and the Java framework layer may also be invoked by other source codes in the same layer of the operating system. For example, instead of the invocation to the added system APIs at the application layer, a C/C++ function library of the universal secret communication platform may be invoked directly at the C/C++ framework layer of a native VoIP of the Android system, or Java APIs of the universal secret communication platform may be invoked directly at the Java framework layer of a native VoIP of the Android system. However, it is not appropriate for a third-party developer of application layer software to use since codes in the bottom layers of the Android are modified in this method.

The source codes of the Android are recompiled after being modified, to generate a new image file of the Android operating system containing the universal secret communication platform, and the image file is then written into the intelligent mobile terminal.

In step (2), the intelligent mobile terminal is directly connected to a key terminal in the secret communication support network, downloads shared keys between the intelligent mobile terminal and the secret communication support network. The shared keys are stored in the intelligent mobile terminal. The intelligent mobile terminal is disconnected with the key terminal after the shared keys are downloaded.

Figure 2:
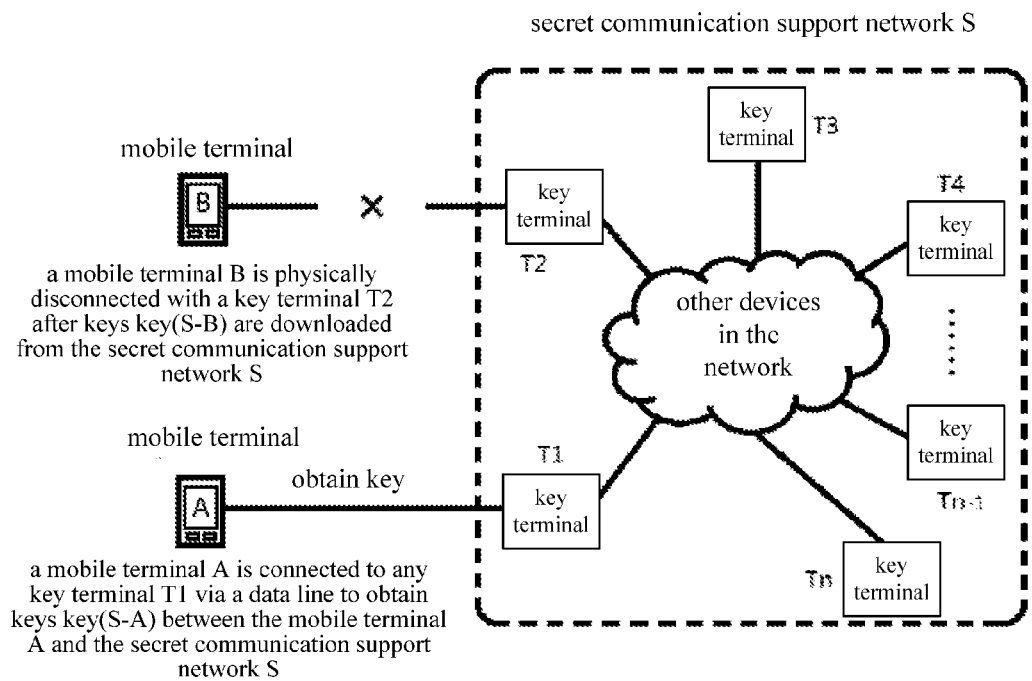
FIG. 2 is a schematic diagram of a process of downloading shared keys between a mobile terminal and a secret communication support network by the mobile terminal.

As shown in FIG. 2, mobile terminals A and B are connected to a key terminal T1 and a key terminal T2 respectively in a wired way (theoretically, the mobile terminal may be connected to any one of key terminals T1 to Tn. However, in actual application, a user always selects a closer key terminal). The two key terminals are a portion of a secret communication support network S. The mobile terminal A downloads shared keys key(S-A) between the mobile terminal A and the secret communication support network S and stores the shared keys key(S-A) into a memory card thereof. The mobile terminal B downloads shared keys key(S-B) between the mobile terminal B and the secret communication support network S and stores the shared keys key(S-B) in a memory card thereof. After the shared keys are downloaded, a wired connection between the mobile terminal and the key terminal is disconnected. The shared keys key(S-A) and key(S-B) may be generated by the secret communication support network S in multiple ways.

I. For example, in a quantum secret communication, a key terminal may directly generate quantum keys by using inner quantum key transceivers in the secret communication support network.

II. In a classical secret communication, various classical random number generators may be used to independently generate keys based on various classical random number generation algorithms in the secret communication support network, and then the keys are transmitted to a key terminal through a classical network.

Figure 3:
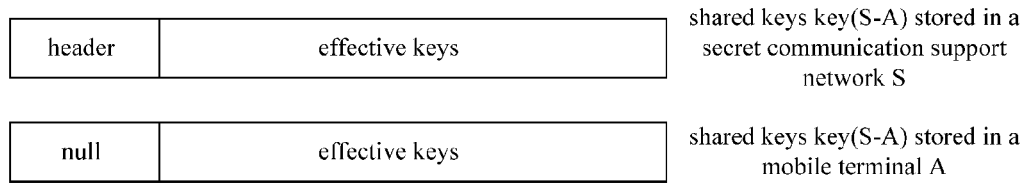
FIG. 3 is a schematic diagram of comparing shared keys stored in a secret communication support network with the ones stored in a mobile terminal.

Information on current usage of the shared keys, for example, which part of the shared keys key(S-A) between the secret communication support network S and the mobile terminal A is used currently, is stored in a header of the shared keys stored in the secret communication support network. When the shared keys are downloaded, the header thereof is filtered out and not downloaded to the mobile terminal, and the header is only reserved in the secret communication support network (as shown in FIG. 3), so as to reduce loss brought by the malicious steal for the shared keys stored in the mobile terminal by an attacker. It is difficult for the attacker to determine which part of the keys was used in a former communication and which part of the keys is to be used in a next communication, from a large amount of data blocks of the shared keys, without critical locating information.

Figure 4:
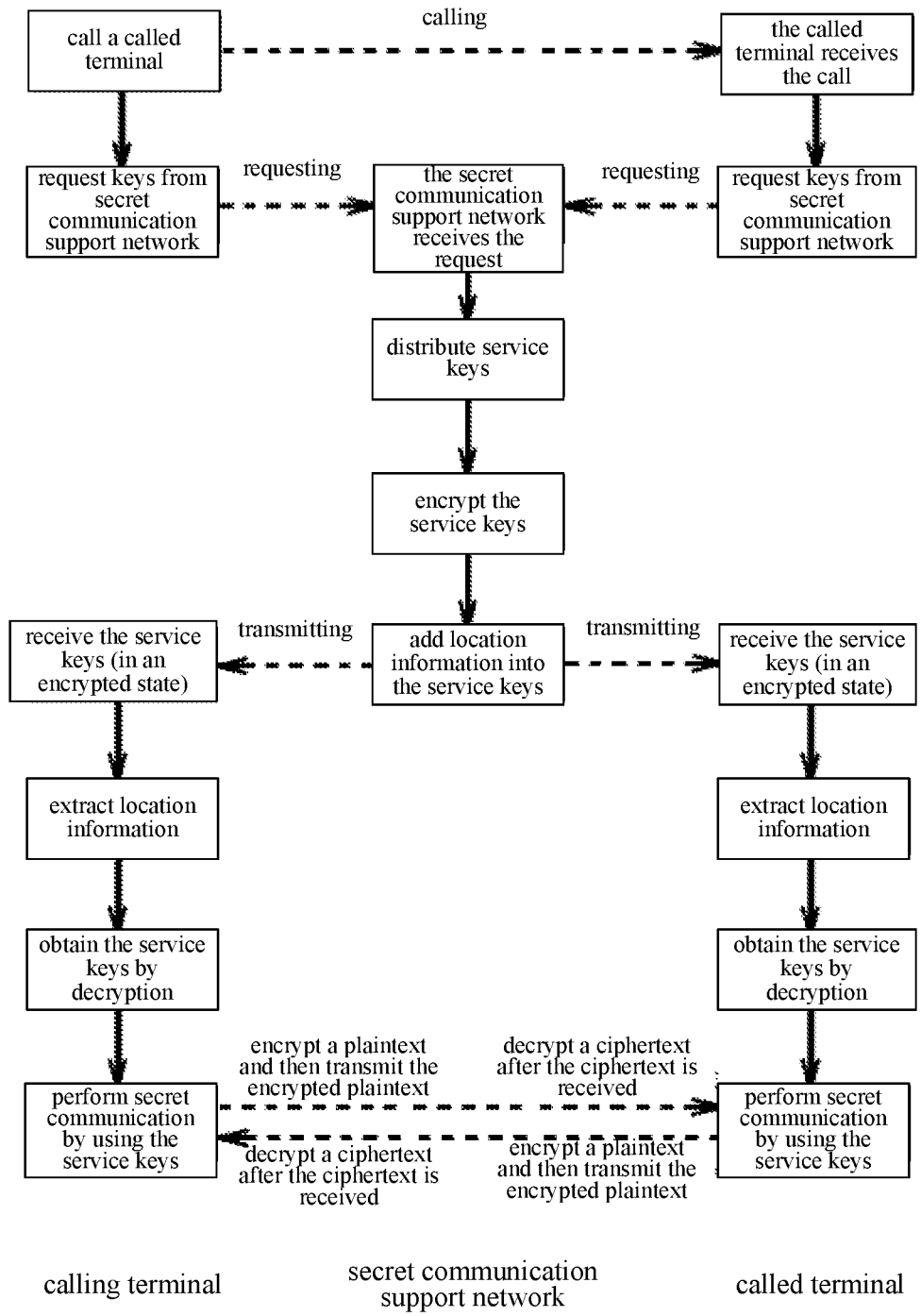
FIG. 4 is a schematic diagram of a process of distributing service keys.

An overall flow of steps (3) to (6) is shown in FIG. 4. Taking a VoIP call service as an example, details are described as follows.

In step (3), after a communication service is initiated, the intelligent mobile terminal generates service key acquisition threads by invoking the APIs of the universal secret communication platform in the bottom layers of the system, and requests service keys for the communication from the secret communication support network. The step contains the following steps.

I. In the case that a calling mobile terminal initiates a call and a called mobile terminal receives the call, the corresponding communication software in the application layer may invoke the APIs of the universal secret communication platform in the bottom layers of the system, and create new service key acquisition threads. Then, the new service key acquisition threads are connected to the secret communication support network, and requests to download service keys for the call. Different service keys may be requested based on the requirements of different communication services. For example, VoIP call software may request several MBs of service keys, and SMS short message software may request several hundred bytes of service keys. When invoking the APIs of the universal secret communication platform in the bottom layers of the system, the communication software provides different parameters, so as to obtain different service keys. Each intelligent mobile terminal needs to create two threads. One is used to download service keys for encrypting the call, and the other is used to download service keys for decrypting the call. The service keys for encrypting the call are used to encrypt voices of his own and the service keys for decrypting the call are used to decrypt encrypted voices from the other person.

II. After the service key acquisition threads are connected to the secret communication support network wirelessly, the intelligent mobile terminal transmits information related to the communication to the secret communication support network, and hence the secret communication support network provides the service keys for the intelligent mobile terminal. The information related to the communication includes an identity of the calling terminal, an identity of the called terminal, authentication information, information for indicating which service the service keys are requested for (VoIP service), and information for indicating whether the service keys are used to perform encryption or decryption.

In step (4), the secret communication support network distributes the service keys for the communication to the intelligent mobile terminal participating in the communication after the request for the service keys is received. The step contains the followings.

I. Network service threads are established, to wait for a connection to the service key acquisition threads of the intelligent mobile terminal.

II. After a connection to the intelligent mobile terminal is established and the request for the service keys is received from the intelligent mobile terminal, the secret communication support network obtains a service type of the communication, an identity of the terminal, authentication information, a purpose of the service keys; and determines whether the intelligent mobile terminal has permission to request the service keys; and then distributes the service keys to be downloaded to the intelligent mobile terminal based on the information provided by the intelligent mobile terminal in a case that the intelligent mobile terminal has the permission. For example, if the communication is a VoIP call, the distributed service keys may be in MBs. If the communication is an SMS short message, only several hundred bytes of service keys are distributed. For example, in the case of one-time pad, service keys are symmetric keys composed of a series of random numbers, which may be generated by the secret communication support network in a way such as a quantum way, a software algorithm and a physical random number generation method.

Figure 5:
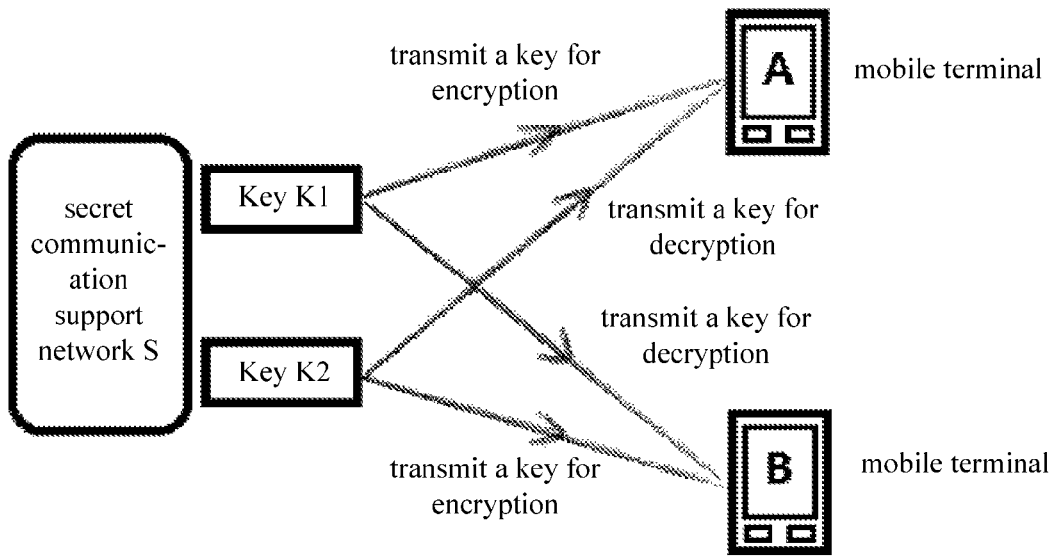
FIG. 5 is a schematic diagram of a cross distribution for service keys in a bi-directional real-time communication service.

When the keys are distributed for a VoIP service, service keys for encryption and decryption distributed to the calling mobile terminal and the called mobile terminal have a cross relationship. That is, the service keys for encryption distributed to the calling mobile terminal correspond to the service keys for decryption distributed to the called mobile terminal, and the service keys for decryption distributed to the calling mobile terminal correspond to the service keys for encryption distributed to the called mobile terminal. As shown in FIG. 5, the mobile terminal A communicates with the mobile terminal B, the secret communication support network S transmits a service key K1 to the mobile terminal A as a service key for encryption and transmits the service key K1 to the mobile terminal B as a service key for decryption. Similarly, the secret communication support network S transmits a service key K2 to the mobile terminal B as a service key for encryption and transmits the service key K2 to the mobile terminal A as a service key for decryption.

III. The secret communication support network encrypts the service keys to be transmitted, by using the shared keys between the secret communication support network and the intelligent mobile terminal. When encrypting the service keys, the secret communication support network extracts current usage location of the shared keys from the header of the shared keys between the secret communication support network and the intelligent mobile terminal; and encrypts the service keys to be transmitted, by using the shared keys starting from the current usage location; and implicitly adds the information on the location into some idle reserved bits of the encrypted service keys, to inform the intelligent mobile terminal that the intelligent mobile terminal should decrypt the received service keys by using the shared keys between the intelligent mobile terminal and the secret communication support network from the same location. The secret communication support network updates the header of the shared keys after each time a portion of the shared keys between the secret communication support network and a certain intelligent mobile terminal are used, to precisely reflect the latest usage situation of the shared keys.

IV. The secret communication support network transmits the encrypted service keys to the intelligent mobile terminal wirelessly.

In step (5), the intelligent mobile terminal receives the service keys for the communication from the secret communication support network by invoking the APIs of the universal secret communication platform in the bottom layers of the system, and stores the service keys in a memory space of the intelligent mobile terminal.

The intelligent mobile terminal extracts location information implied in the encrypted service keys after receiving the encrypted service keys transmitted by the secret communication support network. The location information indicates a usage location of the shared keys between the intelligent mobile terminal and the secret communication support network. The intelligent mobile terminal can know which location of the shared keys should be used from, and can decrypt the received service keys by combining the location information with the shared keys between the intelligent mobile terminal and the secret communication support network stored in the intelligent mobile terminal. Preferably, both the service keys required for each call and the shared keys between the intelligent mobile terminal and the secret communication support network are one-time pad, i.e., the used keys are no longer used again, to ensure a high security. Of course, other usage ways of keys, such as various popular symmetric encryption algorithms and asymmetric encryption algorithms, may also be employed. When the amount of shared keys is not enough, the intelligent mobile terminal downloads new shared keys from the secret communication support network according to step (2).

Since a VoIP call spends a period of time and has a real-time requirement, the amount of service keys required for the VoIP call is large, and thus it will take a long time to download all service keys. The call can not wait to be started until the service keys are completely downloaded. Since a rate of downloading the service keys is much faster than a rate of using the same, a VoIP application should be informed that the service keys can be used, once the amount of service keys downloaded by the intelligent mobile terminal reaches a minimal threshold under which a VoIP secret call can be performed. Then, the service keys are used, and are downloaded continuously at the same time until the service keys are downloaded completely.

Figure 6:
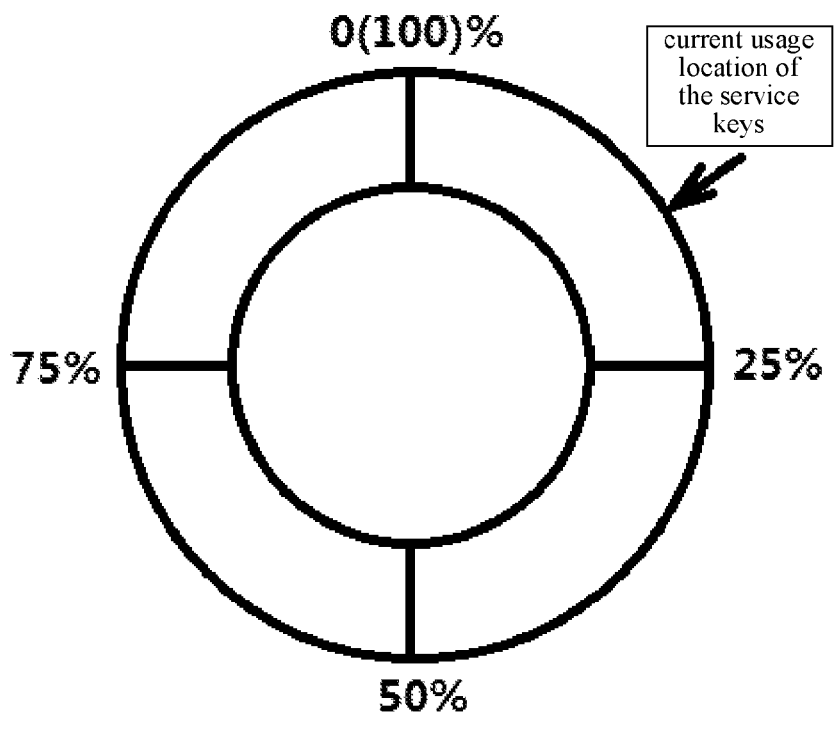
FIG. 6 is a logical diagram of a storage structure for service keys in a mobile terminal.

The intelligent mobile terminal sets up a logically annular memory space (as shown in FIG. 6) for each service key acquisition thread. A size of the annular memory space depends on a service type of the communication. The annular memory space is configured to store the service keys received from the secret communication support network. In this case, the actual service keys used for the call are not stored in a permanent medium of the mobile terminal, which will be cleared immediately from the memory after the call is ended. Therefore, the service keys are protected from being exported afterward and the service keys for each call are not used again.

A reading location pointer is provided by the intelligent mobile terminal for each annular memory space for storing the service keys, and points to a certain location of the annular memory space. When it is required to encrypt (decrypt) a segment of communication plaintext (ciphertext), the appropriate amount of service keys are read from the location to which the pointer points, and then are used to encrypt (decrypt) the segment of communication plaintext (ciphertext). The pointer moves on in the annular memory space, and always points to a starting address of the service keys to be read next time. If the pointer passes the end of the annular space, the service keys are continued to be read from the beginning of the annular space. For the VoIP service, two annular memory spaces are needed in one call, which are configured to store the service keys for encryption and the service keys for decryption, respectively. Meanwhile, the intelligent mobile terminal provides a writing location pointer for each annular memory space in which the service keys are stored. The received service keys are stored in the annular memory space from a location pointed by the pointer. The pointer moves on in the annular memory space and always points to a starting address of the annular memory space where service keys are stored next time. If the pointer passes the end of the annular space, the service keys are continuously written from the beginning of the annular space. The amount of service keys requested from the secret communication support network each time does not exceed a size of the annular memory space. After the service keys are downloaded the first time, the intelligent mobile terminal requests to download service keys again from the secret communication support network, in a case that a distance between locations pointed by the writing location pointer and the reading location pointer respectively in the annular memory space reaches a predetermined threshold.

For example, after the first time the service keys are downloaded, a former 50% of the annular memory space is filled with the service keys. When the service keys at 25% of the annular memory space are used, the intelligent mobile terminal requests to download the service keys again from the secret communication support network. Then, the intelligent mobile terminal downloads from the secret communication support network the service keys having a size equal to 50% of the annular memory space, and fills the downloaded service keys in the latter 50% of the annular memory space. Similarly, when the service keys at 75% of the annular memory space are used, the intelligent mobile terminal downloads the service keys having a size equal to 50% of the space from the secret communication support network again and fills the downloaded service keys into the former 50% of the annular memory space. The old service keys are replaced by the currently downloaded service keys at the same location. In services spending a long communication time and consuming the keys fast, such as a VoIP call and a video call, the service keys downloaded into the intelligent mobile terminal may be not enough as the communication proceeds. In this case, the intelligent mobile terminal may inform the secret communication support network and continuously downloads service keys for use.

Since the service keys are stored in the memory of the intelligent mobile terminal instead of a permanent storage device, after the communication is ended, the memory space for storing the service keys is retrieved by the system, and data stored in the memory space are destroyed and can not be used and read again.

In step (6), the intelligent mobile terminal performs a secret communication by using the service keys. Two parties of the communication encrypt plaintext by using the respective service keys for encryption, transmit the encrypted plaintext to the other party, and decrypt the ciphertext by using corresponding service keys for decryption to obtain the plaintext after receiving the ciphertext from the other party.

In the embodiment, a universal secret communication platform based on the Android intelligent operating system and a method for distributing the communication keys based on the universal secret communication platform are provided. Details of using the communication keys are not discussed herein. For example, in the embodiment, preferably, an encryption/decryption operation of one-time pad is performed on the communication information by using the symmetric service keys downloaded from the secret communication support network. However, it is not excluded that the asymmetric keys are distributed by the above universal secret communication platform and the distribution method, or an encryption/decryption processing other than one-time pad is used for the service keys.

SUPPLEMENTAL DESCRIPTION FOR EMBODIMENTS

In the embodiments described above, a VoIP service is taken as an example. In addition, the solution of the disclosure may be applied to a field such as a video call. These services have the following common features such as real-time bi-directional interaction, a large amount of information, and that the service keys distributed at one time do not meet the requirement of the whole communication process.

In addition, another kind of communication service such as an SMS short message is not performed in a way of real-time bi-directional interaction, which is similar to a service in a way of question-and-answer and having the small amount of information at one time. The solution of the disclosure may be applied to this kind of service by performing the following modifications.

<1>. It is not necessary that the memory space set up by the intelligent mobile terminal for the service keys is the logically annular memory space. That is because the SMS information is short, the amount of required service keys is less, and the service keys can be downloaded completely at one time and do not need to be downloaded again.

<2>. In the bi-directional real-time interaction of the VoIP service, the secret communication support network needs to prepare two blocks of service keys for each call (as shown in FIG. 5). In an SMS communication, the secret communication support network only needs to prepare one block of service keys for one SMS message, and transmit the one block of service keys to a transmitter and a receiver. The transmitter uses the service keys to perform encryption and the receiver uses the service keys to perform decryption. Similarly, the intelligent mobile terminal only needs to create one thread to request required service keys from the secret communication support network.

<3>. The transmitter of the SMS short message requests service keys for encryption from the secret communication support network before transmitting a ciphertext. The receiver of the SMS short message requests the service keys for decryption from the secret communication support network after receiving the short message. A time span between a request for the service keys for encryption and a request for the service keys for decryption may be long due to a network of the operator. Therefore, the secret communication support network needs to temporarily store the request for service keys transmitted by the transmitter for a time duration; and then it is determined whether the request for the service keys transmitted by the transmitter matches with a request for service keys transmitted by the receiver, after the request for the service keys transmitted by the receiver is received.

<4>. In the VOIP service, a portion of the service keys is downloaded, and then a service program is informed of starting to use the service keys. On the contrary, since the SMS information is short, the service keys required for the SMS short message are downloaded completely, and then may be used.

The above changes or other modifications or changes to be easily come up with made to a non-real-time communication service which does not have bi-directional interaction such as an SMS short message without departing from the range of technical solutions according to the present disclosure will fall within the scope of protection of the present disclosure.

There are multiple types of communication services. In the embodiments of the present disclosure, a way of establishing and applying a universal secret communication platform based on the Android intelligent mobile terminal and a method for distributing communication keys based on the universal secret communication platform are discussed by taking the VoIP service as an example. However, the technical solutions according to the present disclosure are not limited to be applied to the VoIP, the short message, the video call and the like mentioned, and secret communications may be realized in other type of communication services by the universal secret communication platform according to the present disclosure. In other communication services, detail changes in invoking the universal secret communication platform (such as invoking timing, invoking position, parameters of service key request/service key downloading, memory space management) should be considered as deformations of applications of the technical solutions according to the present disclosure, and belong to the scope of protection of the present disclosure.

Moreover, the present disclosure may be not only used to modify the Android intelligent mobile terminal, but also, directly or with slight changes, applied to other terminal devices such as an intelligent television and a set-top box which runs Android operating system, to provide the intelligent devices with a secret information service corresponding to a function of the intelligent devices.

The invention claimed is:

1. A method for distributing communication keys based on an Android intelligent mobile terminal, comprising:
   (1) establishing a universal secret communication platform in bottom layers of an Android operating system, invoking Application Programming Interfaces (APIs) of the universal secret communication platform in source codes of communication software programs in an application layer, compiling modified source codes of the Android operating system into an image file, and writing the image file into the intelligent mobile terminal;
   (2) directly connecting the intelligent mobile terminal to a key terminal in a secret communication support network, downloading shared keys between the intelligent mobile terminal and the secret communication support network, storing the shared keys into the intelligent mobile terminal, and disconnecting the intelligent mobile terminal with the key terminal after the shared keys are downloaded;
   (3) after a communication service is initiated, generating, by the intelligent mobile terminal, a service key acquisition thread by invoking the APIs of the universal secret communication platform in the bottom layers of the system, and requesting service keys for the communication from the secret communication support network;
   (4) distributing, by the secret communication support network, the service keys for the communication to the intelligent mobile terminal participating in the communication, after the request for the service keys is received;
   (5) receiving, by the intelligent mobile terminal, the service keys for the communication from the secret communication support network by invoking the APIs of the universal secret communication platform in the bottom layers of the system; and storing, by the intelligent mobile terminal, the service keys in a memory space of the intelligent mobile terminal; and
   (6) performing, by the intelligent mobile terminal, a secret communication by using the service keys.

2. The method for distributing the communication keys based on the Android intelligent mobile terminal according to claim 1, wherein the step (1) of establishing the universal secret communication platform comprises:
   (1-1) adding a secret communication function library in a C/C++ framework layer of source codes of the Android operating system, wherein the secret communication function library is configured to realize a basic function related to the secret communication, the basic function comprises instruction interaction with the secret communication support network, key request, key downloading, key management and encryption-decryption operations; and an invocation to the secret communication function library is provided for a Java framework layer of the Android through Java Native Interface (JNI), and the secret communication function library is compiled into a '*.so' library file; and
   (1-2) adding a secret communication class to the Java framework layer of the source codes of the Android operating system, wherein the secret communication class invokes the secret communication function library in the C/C++ framework layer with the JNI interface, encapsulates and extends the secret communication function library in the Java framework layer, and provides an upper application layer with secret communication related system APIs, which are the APIs of the universal secret communication platform and to be invoked by various communication software in the application layer.

3. The method for distributing the communication keys based on the Android intelligent mobile terminal according to claim 1, wherein the step (3) of requesting, by the intelligent mobile terminal, the service keys comprises:
   (3-1) after the communication service is initiated, invoking, by the communication software in the application layer, the APIs of the universal secret communication platform in the bottom layers of the system; and generating a new service key acquisition thread, wherein the new service key acquisition thread is connected to the secret communication support network wirelessly; and
   (3-2) after the connection is established, transmitting, by the intelligent mobile terminal, information related to the communication to the secret communication support network, to request service keys for the communication, wherein the information comprises an identity of a calling terminal, an identity of a called terminal, authentication information, information for indicating which service the service keys are requested for, and information for indicating whether the service keys are used to perform encryption or decryption.

4. The method for distributing the communication keys based on the Android intelligent mobile terminal according to claim 3, wherein the step (4) of distributing, by the secret communication support network, the service keys to the intelligent mobile terminal comprises:
   (4-1) establishing a network service thread, to wait for a connection to the service key acquisition thread of the intelligent mobile terminal;
   (4-2) after a connection to the intelligent mobile terminal is established and the request for the service keys is received from the intelligent mobile terminal, obtaining a service type of the communication, an identity of the terminal, authentication information and a purpose of the service keys, determining whether the intelligent mobile terminal has permission to request the service keys; and distributing the service keys to be downloaded to an intelligent mobile terminal having the permission;
   (4-3) encrypting, by the secret communication support network, the service keys to be transmitted, by using the shared keys between the intelligent mobile terminal and the secret communication support network; and
   (4-4) transmitting, by the secret communication support network, the encrypted service keys to the intelligent mobile terminal wirelessly.

5. The method for distributing the communication keys based on the Android intelligent mobile terminal according to claim 4, wherein for the shared keys between the secret communication support network and the intelligent mobile terminal,
- (5-1) current usage information of the shared keys is stored in a header of the shared keys stored in the secret communication support network; and the header is filtered out, when the shared keys are downloaded to the intelligent mobile terminal;
- (5-2) when encrypting the service keys, the secret communication support network extracts a current usage location of the shared keys from the header of the shared keys between the secret communication support network and the intelligent mobile terminal; encrypts the service keys to be transmitted, by using the shared keys at the current usage location; implicitly adds the information on the location in an idle reserved bit of the encrypted service keys; and updates the header of the shared keys;
- (5-3) after receiving the encrypted service keys transmitted by the secret communication support network, the intelligent mobile terminal extracts the information on the location implied in the encrypted service keys, and decrypts the received service keys by combining the shared keys between the intelligent mobile terminal and the secret communication support network stored in the intelligent mobile terminal with the information on the location and using the shared keys at the location; and
- (5-4) in a case that the amount of shared keys between the secret communication support network and the intelligent mobile terminal is not enough, the intelligent mobile terminal downloads new shared keys from the secret communication support network according to the step (2).

6. The method for distributing the communication keys based on the Android intelligent mobile terminal according to claim 1, wherein the step (5) of receiving the service keys, by the intelligent mobile terminal, comprises:
once the amount of the service keys downloaded by the intelligent mobile terminal reaches a minimal threshold under which a secret communication is to be performed for a current service type, informing a corresponding application of being capable of using the service keys, and then using the service keys while continuously downloading the service keys until the service keys are downloaded completely.

7. The method for distributing the communication keys based on the Android intelligent mobile terminal according to claim 1, wherein in the memory space of the intelligent mobile terminal in the step (5),
- (7-1) a logically annular memory space is set up by the intelligent mobile terminal for each service key acquisition thread, wherein the annular memory space is configured to store the service keys received from the secret communication support network, and a size of the memory space depends on a service type;
- (7-2) a reading location pointer is provided by the intelligent mobile terminal for each annular memory space for storing the service keys, wherein in a secret communication using the service keys, the appropriate amount of service keys are read from a location pointed by the reading location pointer, and then are used to perform encryption-decryption on communication information; the reading location pointer moves on in the annular memory space and always points to a starting address of the service keys to be read next time, and the service keys are continued to be read from the beginning of the annular space when the pointer passes the end of the annular space; and
- (7-3) a writing location pointer is provided by the intelligent mobile terminal for each annular memory space for storing the service keys, wherein the received service keys are stored into the annular memory space from a location pointed by the writing location pointer; the writing location pointer moves on in the annular memory space and always points to a starting address of the annular memory space where service keys are stored next time, and service keys are continuously written from the beginning of the annular space when the pointer passes the end of the annular space; the amount of service keys requested from the secret communication support network each time does not exceed a size of the annular memory space;
- (7-4) after the service keys are downloaded the first time, in a case that a distance between locations pointed by the writing location pointer and reading location pointer respectively in the annular memory space reaches a predetermined threshold, the intelligent mobile terminal requests to download service keys again from the secret communication support network; and
- (7-5) after the communication service is ended, the memory space for storing the service keys is retrieved by the system, and data in the memory space are destroyed.

8. The method for distributing the communication keys based on the Android intelligent mobile terminal according to claim 1, wherein the shared keys and/or the service keys are used in a way of one-time pad.

9. The method for distributing the communication keys based on the Android intelligent mobile terminal according to claim 2, wherein the step (3) of requesting, by the intelligent mobile terminal, the service keys comprises:
- (3-1) after the communication service is initiated, invoking, by the communication software in the application layer, the APIs of the universal secret communication platform in the bottom layers of the system; and generating a new service key acquisition thread, wherein the new service key acquisition thread is connected to the secret communication support network wirelessly; and
- (3-2) after the connection is established, transmitting, by the intelligent mobile terminal, information related to the communication to the secret communication support network, to request service keys for the communication, wherein the information comprises an identity of a calling terminal, an identity of a called terminal, authentication information, information for indicating which service the service keys are requested for, and information for indicating whether the service keys are used to perform encryption or decryption.

10. The method for distributing the communication keys based on the Android intelligent mobile terminal according to claim 6, wherein the shared keys and/or the service keys are used in a way of one-time pad.

* * * * *

UNITED STATES PATENT AND TRADEMARK OFFICE
CERTIFICATE OF CORRECTION

PATENT NO. : 9,668,127 B2
APPLICATION NO. : 14/896231
DATED : May 30, 2017
INVENTOR(S) : Yong Zhao and Chunhua Liu It is certified that error appears in the above-identified patent and that said Letters Patent is hereby corrected as shown below:

On the Title Page

Item (71) delete "Shangdong" and insert -- Shandong --, therefore.

Signed and Sealed this
Twelfth Day of September, 2017

Joseph Matal
*Performing the Functions and Duties of the*
*Under Secretary of Commerce for Intellectual Property and*
*Director of the United States Patent and Trademark Office*